United States Patent
Kwak

(10) Patent No.: US 9,612,484 B2
(45) Date of Patent: Apr. 4, 2017

(54) LIQUID CRYSTAL DISPLAY AND METHOD FOR MANUFACTURING THE SAME

(71) Applicant: Samsung Display Co., Ltd., Yongin-si (KR)

(72) Inventor: Chang Hun Kwak, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 14/960,774

(22) Filed: Dec. 7, 2015

(65) Prior Publication Data

US 2016/0202529 A1    Jul. 14, 2016

(30) Foreign Application Priority Data

Jan. 9, 2015    (KR) .................. 10-2015-0003661

(51) Int. Cl.
*G02F 1/1339*    (2006.01)
*G02F 1/1335*    (2006.01)

(52) U.S. Cl.
CPC .... *G02F 1/13394* (2013.01); *G02F 1/133512* (2013.01); *G02F 1/133514* (2013.01); *G02F 2001/13396* (2013.01)

(58) Field of Classification Search
None
See application file for complete search history.

(56) References Cited

U.S. PATENT DOCUMENTS

| 8,767,147 | B2 | 7/2014 | Yang et al. | |
| 2009/0256979 | A1* | 10/2009 | Shin | G02F 1/133371 349/38 |
| 2009/0273747 | A1* | 11/2009 | Shin | G02F 1/136213 349/107 |
| 2013/0329155 | A1* | 12/2013 | Kwak | G02F 1/136 349/43 |
| 2014/0049717 | A1 | 2/2014 | Kwak et al. | |
| 2014/0232970 | A1 | 8/2014 | Huh et al. | |
| 2015/0017869 | A1 | 1/2015 | Kwon et al. | |
| 2015/0092138 | A1* | 4/2015 | Kwak | G02F 1/133512 349/85 |
| 2015/0103296 | A1* | 4/2015 | Kwak | G02F 1/133512 349/106 |

FOREIGN PATENT DOCUMENTS

| KR | 1020110038477 | 4/2011 |
| KR | 1020120014749 | 2/2012 |
| KR | 1020140023710 | 2/2014 |

* cited by examiner

*Primary Examiner* — Johannes P Mondt
(74) *Attorney, Agent, or Firm* — H.C. Park & Associates, PLC

(57) ABSTRACT

A liquid crystal display includes: a first insulating substrate; a plurality of color filters positioned on the first insulating substrate; a light blocking member positioned on the plurality of color filters; a second insulating substrate facing the first insulating substrate; and a spacer positioned between the first insulating substrate and the second insulating substrate, wherein the spacer includes a main column spacer and first and second sub-column spacers, and the first and second sub-column spacers are positioned at both sides of the main column spacer.

19 Claims, 13 Drawing Sheets

LIQUID CRYSTAL DISPLAY AND METHOD FOR MANUFACTURING THE SAME

CROSS-REFERENCE TO RELATED APPLICATION

This application claims priority from and the benefit of Korean Patent Application No. 10-2015-0003661, filed on Jan. 9, 2015, which is hereby incorporated by reference for all purposes as if fully set forth herein.

BACKGROUND

Field

Exemplary embodiments relate to a liquid crystal display and a method for manufacturing the same.

Discussion of the Background

A flat panel display may be used as a display device. Various display devices, such as a liquid crystal display, an organic light emitting diode display, a plasma display, an electrophoretic display, and an electrowetting display may be used.

The liquid crystal display (LCD) is one of the flat panel displays most widely used currently. Such LCDs include two sheets of display panels in which an electrode is formed and a liquid crystal layer interposed therebetween. In the liquid crystal display, a voltage is applied to the electric field generating electrode to generate an electric field in the liquid crystal layer and the orientation of liquid crystal molecules of the liquid crystal layer is determined and polarization of incident light is controlled based on the generated electric field to display an image.

Among the liquid crystal displays, a liquid crystal display which is currently in wide use has a structure in which electric field generating electrodes such as a pixel electrode and a common electrode are provided in two display panels, respectively. Among those, mainstream liquid crystal displays have a structure in which one display panel (hereinafter, referred to as 'thin film transistor array panel') is arranged with a plurality of thin film transistors and pixel electrodes in a matrix form and the other display panel (hereinafter, referred to as 'common electrode display panel') is formed with color filters (e.g., red, blue, and green), and a front surface of the other display panel is covered with a common electrode.

The liquid crystal display has a misalignment problem since it is difficult to accurately align the pixel electrode and the color filter which are formed in different display panels. To address the above problem, a structure in which a light blocking member is formed in the display panel in which the pixel electrode and the thin film transistor are formed has been proposed. In this case, the color filter may also be formed in the display panel in which the pixel electrode is formed.

A gap between the liquid crystal layers interposed between the two display panels is called a cell gap. The cell gap affects the operational characteristics of a liquid crystal display such as the response speed, contrast ratio, viewing angle, luminance uniformity, and the like. However, when the cell gap is non-uniform, a uniform image is not displayed over the whole screen, and thus image quality may deteriorate. Therefore, to keep a uniform cell gap over the whole region on a substrate, a spacer is formed on one side of the two substrates. A column spacer (CS) has been mainly used as the spacer.

For simplification, a light blocking member, such as a black matrix, and the spacer may be simultaneously formed. To simultaneously form the light blocking member, the spacer, and the like, there is a need to form a multi step element.

However, it is difficult to stably form a step between a main column spacer and a sub-column spacer due to the lack of a margin in material exposure. As a result, a column spacer and a sub-column spacer are formed with similar heights, and are highly likely to cause a smear phenomenon and create an active unfilled area (AUA) which prevents liquid crystal from filling in part of the liquid crystal display panel.

The above information disclosed in this Background section is only for enhancement of understanding of the background of the invention and therefore it may contain information that does not form the prior art that is already known in this country to a person of ordinary skill in the art.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display and a method for manufacturing the same.

Additional aspects will be set forth in the detailed description which follows, and, in part, will be apparent from the disclosure, or may be learned by practice of the inventive concept.

An exemplary embodiment discloses a liquid crystal display including: a first insulating substrate; a plurality of color filters positioned on the first insulating substrate; a light blocking member positioned on the plurality of color filters; a second insulating substrate facing the first insulating substrate; and a spacer positioned between the first insulating substrate and the second insulating substrate, wherein the spacer includes a main column spacer and first and second sub-column spacers, and the first and second sub-column spacers are positioned at both sides of the main column spacer.

An exemplary embodiment discloses a method for manufacturing a liquid crystal display including: forming a plurality of color filters on a first insulating substrate; forming a light blocking member and a spacer on the plurality of color filters; and forming a second insulating substrate facing the first insulating substrate, wherein the spacer includes a main column spacer and first and second sub-column spacers and the first and second sub-column spacers are positioned at both sides of the main column spacer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
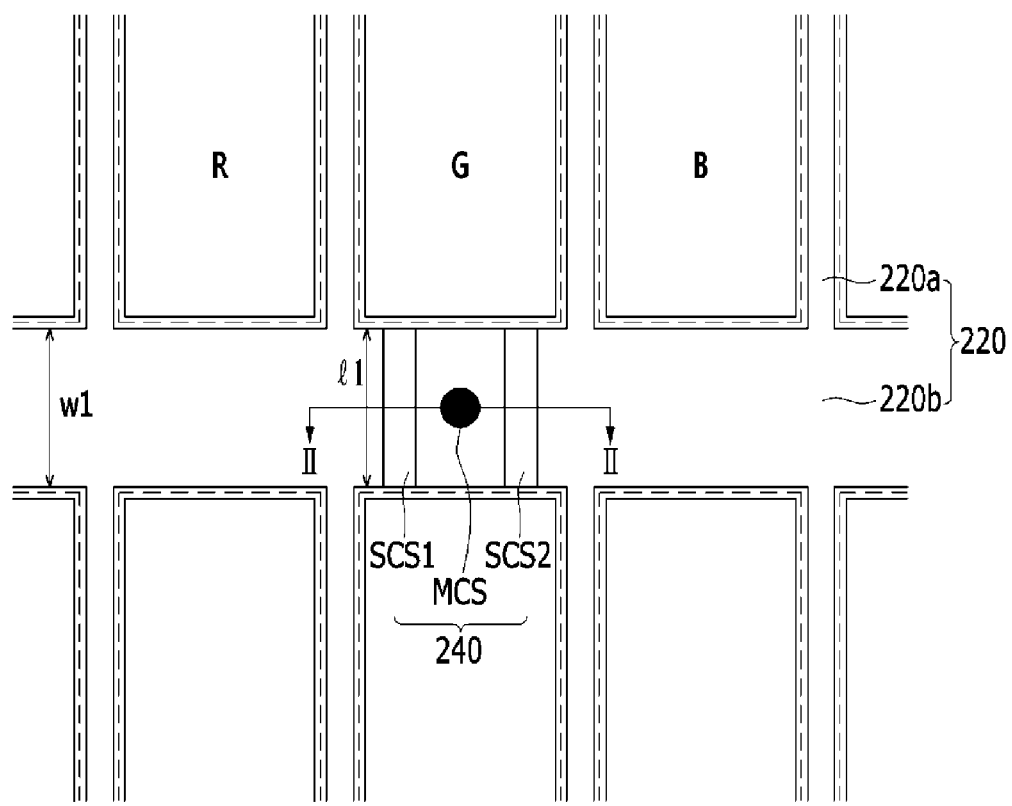
FIG. 1 is a plan view of a liquid crystal display according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
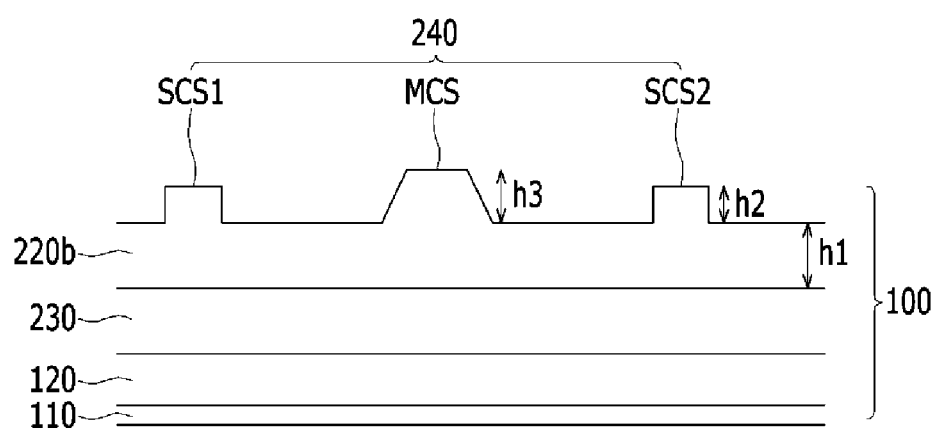
FIG. 2 is a cross-sectional view taken along line II-II of FIG. 1.

Referring to FIGS. 1 and 2, film structure 120 including a thin film transistor is positioned on lower substrate 110. Alternatively, the thin film substrate can be positioned on the upper substrate 210 The thin film transistor is a switching element and may be configured with three terminals including a control terminal, an input terminal, and an output terminal, which will be described below in detail.

A plurality of color filters 230 are positioned on film structure 120. The color filters 230 include a red color filter (R), a green color filter (G), and a blue color filter (B). The plurality of color filters 230 may be formed in parallel with each other in a horizontal direction or may be formed in a stripe form along a vertical direction. Further, the plurality of color filters 230 may be each formed to be spaced apart from each other in a horizontal direction or may be formed to have edges overlap each other.

Light blocking member 220 is positioned on the plurality of color filters 230. Light blocking member 220 includes first light blocking member 220a and second light blocking member 220b. An edge of light blocking member 220 may be formed to overlap the edge of the color filter 230.

First light blocking member 220a may extend long along a vertical direction and, although not illustrated, may be positioned along a direction in which the data line of the thin film transistor extends.

Second light blocking member 220b may extend long along a horizontal direction and, although not illustrated, may be positioned along a direction parallel to the direction in which the gate line of the thin film transistor extends. Second light blocking member 220b may be formed to intersect first light blocking member 220a.

Spacer 240 is positioned on light blocking member 220. That is, main column spacer MCS and first and second sub-column spacers SCS1 and SCS2 are positioned on second light blocking member 220b. The spacer may be made of the same material as light blocking member 220.

Main column spacer MCS is positioned between first and second sub-column spacers SCS1 and SCS2. A cross section of main column spacer MCS may be formed in a circle or an oval.

First and second sub-column spacers SCS1 and SCS2 are positioned at both sides of main column spacer MCS. First and second sub-column spacers SC1 and SC2 may be formed parallel to the data line. That is, first and second sub-column spacers SCS1 and SCS2 are positioned at both sides of the main column spacer in a length direction of second light blocking member 220b, having main column spacer MCS disposed therebetween and have a set length in a width length of second light blocking member 220b. For example, first and second sub-column spacers SCS1 and SCS2 may be formed to have the same length l1 as a width w1 of second light blocking member 220b, as illustrated in FIG. 1.

A cross section of first and second sub-column spacers SCS1 and SCS2 may be formed in a rectangle, as illustrated in FIG. 1. Further, the cross section of first and second sub-column spacers SCS1 and SCS2 may be formed in a polygon including a square, may be formed in a dumbbell, and may be formed in an oval.

The height (h1+h2) of first and second sub-column spacers SCS1 and SCS2 may be formed to be lower than a height (h1+h3) of main column spacer MCS and higher than a height h1 of light blocking member 220. Among main column spacer MCS, first and second sub-column spacers SCS1 and SCS2, and light blocking member 220, height h1+h3 of main column spacer MCS may be highest and height h1 of light blocking member 220 may be lowest.

As described in FIGS. 1 and 2, according to an exemplary embodiment, the first and second sub-column spacer SCS1 and SCS2 are formed at both sides of main column spacer MCS and a step between main column spacer MCS and first and second sub-column spacers SCS1 and SCS2 may be secured, thereby preventing the smear phenomenon.

Hereinafter, various patterns of spacer 240 included in the liquid crystal display illustrated in FIG. 1 will be described with reference to FIGS. 3A to 3G.

Referring to FIGS. 3A to 3G, spacer 240 is positioned on second light blocking member 220b and includes main column spacer MCS and first and second sub-column spacers SCS1 and SCS2. Main column spacer MCS is positioned between first and second sub-column spacers SCS1 and SCS2 and may be formed in a circle or an oval.

First and second sub-column spacers SCS1 and SCS2 may be formed in various forms, as illustrated in FIGS. 3A to 3G. This will be described with reference to FIGS. 3A to 3G.

Figure 3A:
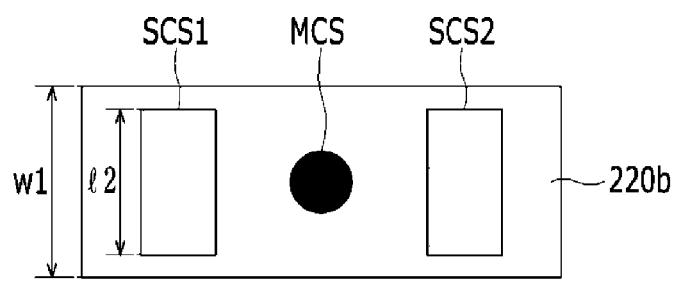
FIGS. 3A to 3G are plan views illustrating various patterns of a spacer included in the liquid crystal display of FIG. 1.

Referring to FIG. 3A, first and second sub-column spacers SCS1 and SCS2 are positioned at both sides of main column spacer MCS, and are spaced apart from main column spacer MCS at a predetermined interval, having main column spacer MCS disposed therebetween in the length direction of second light blocking member 220b. A length l2 of first and second sub-column spacers SCS1 and SCS2 may be formed to be smaller than the width w1 of second light blocking member 220b.

The cross section of first and second sub-column spacers SCS1 and SCS2 may be formed in a rectangle.

This exemplary embodiment describes an example in which first and second sub-column spacers SCS1 and SCS2 are formed to have the same length, but embodiments are not limited thereto, and therefore the length of the first sub-column spacer SCS1 and the length of the second sub-column spacer SCS2 may also be different from each other.

Figure 3B:
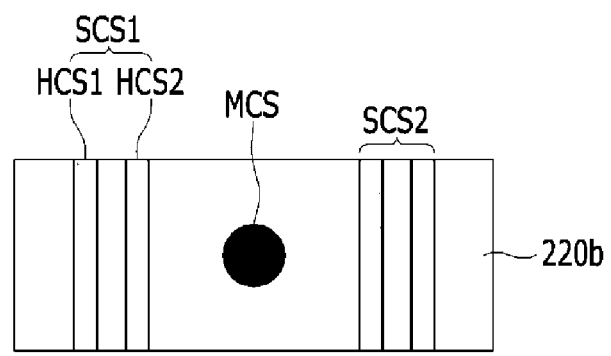

Referring to FIG. 3B, first and second sub-column spacers SCS1 and SCS2 are formed in parallel with a width direction of second light blocking member 220b, having main column spacer MCS disposed therebetween.

First and second sub-column spacers SCS1 and SCS2 include two sub-column spacers HCS1 and HCS2. The two sub-column spacers HCS1 and HCS2 may be formed in parallel with each other.

Herein, this exemplary embodiment describes first and second sub-column spacers SC1 and SC2 including the two sub-column spacers HCS1 and HCS2 as an example, but embodiments are not limited thereto, and therefore the number of sub-column spacers may be at least two. Further, the number of sub-column spacers of the first sub-column spacer SCS1 and the number of sub-column spacers of the second sub-column spacer SCS2 may be different from each other.

Figure 3C:
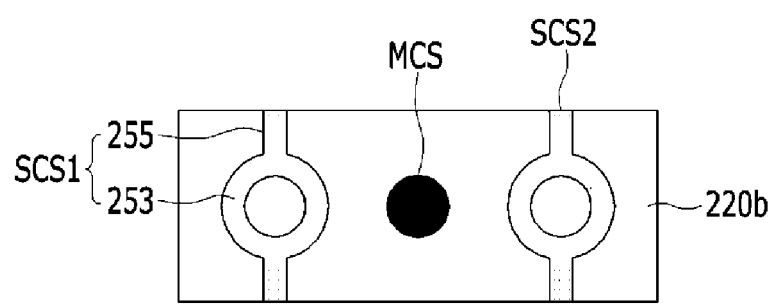

Referring to FIG. 3C, first and second sub-column spacers SCS1 and SCS2 include a ring part 253 and a connection part 255. The ring part 253 is positioned on second light blocking member 220b and may be formed in a donut form. In this case, the ring part 253 may be formed to a position corresponding to main column spacer MCS.

The connection part 255 is formed to be connected to the ring part 253. That is, one end of the connection part 255 is connected to the ring part 253, the other end of the connection part 255 is positioned in a width direction of second light blocking member 220b, and the connection part 255 is positioned in parallel with the width direction of second light blocking member 220b. In this case, the connection part may be connected to both sides of the ring part 253. Further, the connection part 255 may also be formed to be connected only to one side of the ring part 253.

Figure 3D:
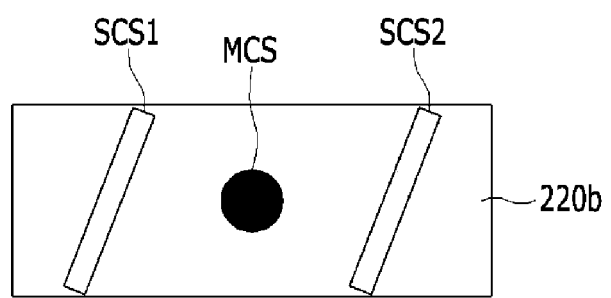

Referring to FIG. 3D, first and second sub-column spacers SCS1 and SCS2 may be formed to be inclined at a predetermined angle, based on main column spacer MCS. The angle may be set differently depending on characteristics of the liquid crystal display, the material of spacer 240, and the like.

An exemplary embodiment describes an example in which first and second sub-column spacers SCS1 and SCS2 are formed at the same angle, but embodiments are not limited thereto, and therefore an inclined angle of the first sub-column spacer SCS1 and an inclined angle of the second sub-column spacer SC2 may also be different from each other.

Figure 3E:
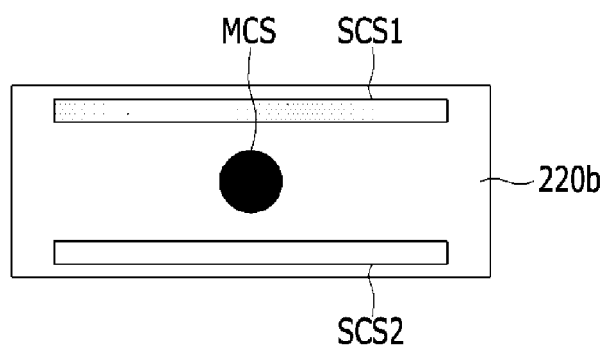

Referring to FIG. 3E, first and second sub-column spacers SCS1 and SCS2 are formed at both sides of main column spacer MCS in the width direction of second light blocking member 220b, having main column spacer MCS disposed therebetween. That is, although not illustrated, first and second sub-column spacers SCS1 and SCS2 may be formed to be in parallel with the gate line of the thin film transistor or perpendicular to the data line.

Figure 3F:
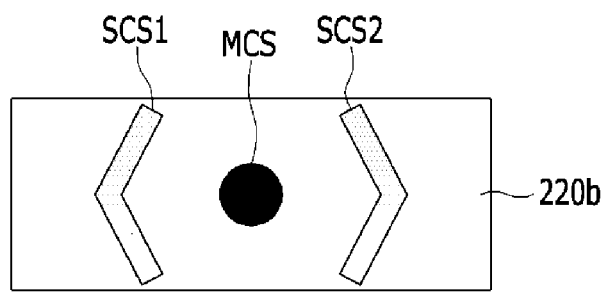

Referring to FIG. 3F, both ends of first and second sub-column spacers SCS1 and SCS2 may be formed to be inclined toward the main column spacer MCS. That is, first and second sub-column spacers SCS1 and SCS2 are formed in the shape of an inequality sign (<, >) and may be bent outwardly based on main column spacer MCS to be formed to face each other. For example, the first sub-column spacer SCS1 may be formed in a '<' form based on main column spacer MCS and the second sub-column spacer SCS2 may be formed in a '>' form based on main column spacer MCS.

Figure 3G:
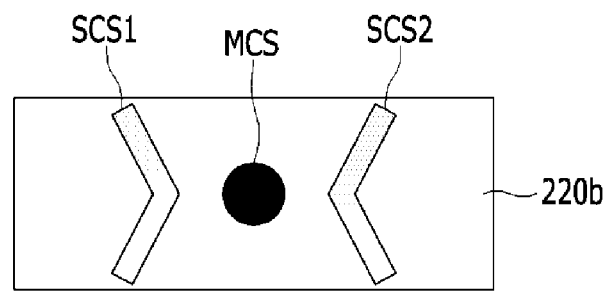

Referring to FIG. 3G, both ends of first and second sub-column spacers SCS1 and SCS2 may be formed to be inclined away from the main column spacer MCS. That is, first and second sub-column spacers SCS1 and SCS2 are formed in the shape of an inequality sign (<, >) and may be bent inwardly based on main column spacer MCS to be formed to face each other. For example, the first sub-column spacer SCS1 may be formed in a '>' form based on main column spacer MCS and the second sub-column spacer SCS2 may be formed in a form based on main column spacer MCS.

Hereinafter, the liquid crystal display embodying the exemplary embodiment of FIG. 1 will be described with reference to FIGS. 4 and 5.

Figure 4:
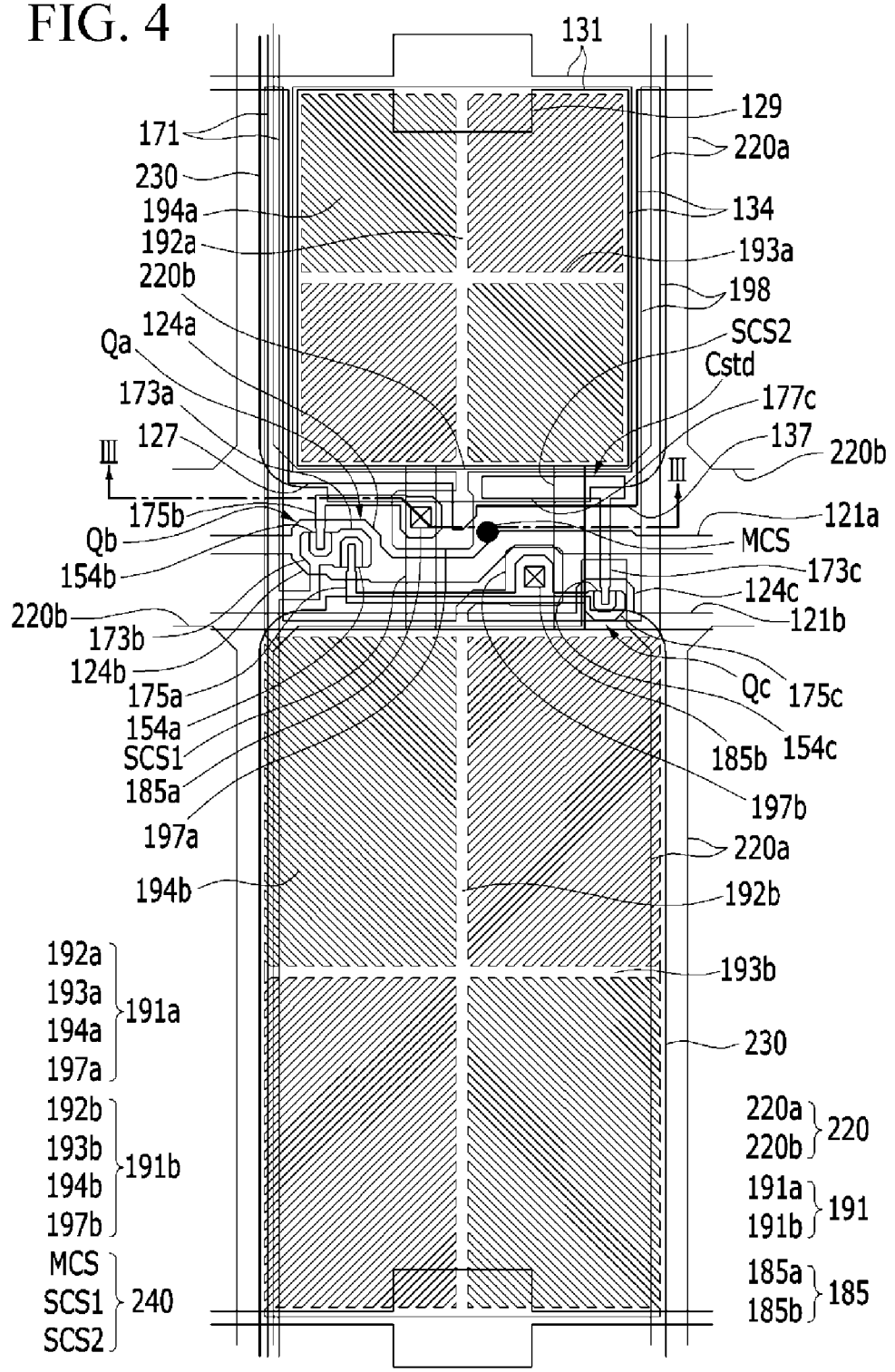
FIG. 4 is a plan view illustrating a liquid crystal display embodying an exemplary embodiment of FIG. 1.
Figure 5:
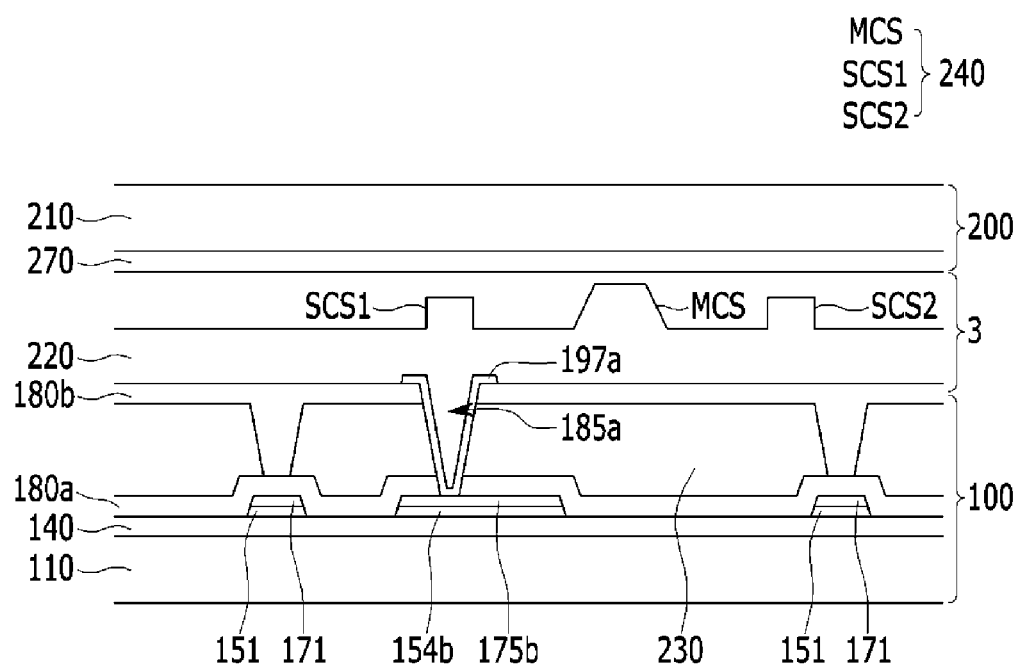
FIG. 5 is a cross-sectional view taken along the line III-III of FIG. 4.

Referring to FIGS. 4 and 5, the liquid crystal display according to an exemplary embodiment includes lower panel 100 and upper panel 200 facing each other and liquid crystal layer 3 interposed between display panels 100 and 200.

A plurality of gate lines including first gate line 121a and second gate line 121b and a plurality of gate conductors including a plurality of sustain electrode lines 131 are formed on lower substrate 110.

Gate lines 121a and 121b mainly extend in a horizontal direction and transfer gate signals. First gate line 121a includes first gate electrode 124a and second gate electrode 124b, which protrude upward and downward. Second gate line 121b includes third gate electrode 124c, which protrudes upward. First and second gate electrodes 124a and 124b are connected to each other to form one protrusion.

Sustain electrode line 131 mainly extends in the horizontal direction to transfer a defined voltage such as common voltage Vcom. Sustain electrode line 131 includes sustain electrode 129, which protrudes upward and downward, vertical parts 134, which substantially vertically extends downward perpendicular to gate lines 121a and 121b, and horizontal part 127, which connect tips of vertical parts 134 to each other. Horizontal part 127 includes capacitive electrode 137, which extends downward.

Gate insulating layer 140 is formed on the gate conductors 121a, 121b, and 131.

A plurality of semiconductor stripes 151, which may be made of amorphous silicon, crystalline silicone, or the like, are formed on gate insulating layer 140. Semiconductor stripe 151 may mainly extend in a vertical direction, and includes first and second semiconductors 154a and 154b, which extend toward first and second gate electrodes 124a and 124b, and are connected to each other and third semiconductor 154c, which is positioned on third gate electrode 124c.

A plural pairs of ohmic contacts (not illustrated) are formed on semiconductors 154a, 154b, and 154c. The ohmic contact (not illustrated) may be made of a material such as n+ hydrogenated amorphous silicon which is doped with silicide or n-type impurities at high concentration.

A data conductor, which includes a plurality of data lines 171, a plurality of first drain electrodes 175a, a plurality of second drain electrodes 175b, and a plurality of third drain electrodes 175c, is formed on the ohmic contact.

Data lines 171 transfer the data signal and mainly extend in a vertical direction to intersect gate lines 121a and 121b. Each data line 171 includes first source electrode 173a and second source electrode 173b, which extend toward first gate electrode 124a and second gate electrode 124b and are connected to each other.

First drain electrode 175h, second drain electrode 175l, and third drain electrode 175c include a wide tip portion and another tip portion having a bar shape. The bar-shaped end of first and second drain electrodes 175a and 175b is partially enclosed with first and second source electrodes 173a and 173b. The wide tip portion of first drain electrode 175a may again extend to form third drain electrode 175c which is bent in a 'U'-letter shape. Wide tip portion 177c of third source electrode 173c overlaps capacitive electrode 137 to form a step-down capacitor Cstd and the bar-shaped tip portion thereof is partially enclosed with third drain electrode 175c.

First gate electrode 124a, first source electrode 173a, and first drain electrode 175a form first thin film transistor Qa along with first semiconductor 154a. Second gate electrode 124b, second source electrode 173b, and second drain electrode 175b form second thin film transistor Qb along with second semiconductor 154b. Third gate electrode 124c, third source electrode 173c, and third drain electrode 175c form third thin film transistor Qc along with third semiconductor 154c.

The semiconductor stripe, which includes first semiconductor 154a, second semiconductor 154b, and third semiconductor 154c, may be have substantially the same plane shape as data conductors 171, 173a, 173b, 173c, 175a, 175b, and 175c and the ohmic contacts thereunder, except for a channel region between source electrodes 173a, 173b, and 173c and drain electrodes 175a, 175b, and 175c.

First semiconductor 154a has a portion that is exposed by not being covered with first source electrode 173a and first drain electrode 175a between first source electrode 173a and first drain electrode 175a. Second semiconductor 154b has a portion that is exposed by not being covered with second source electrode 173b and second drain electrode 175b between second source electrode 173b and second drain electrode 175b. Third semiconductor 154c has a portion that is exposed by not being covered with third source electrode 173c and third drain electrode 175c between third source electrode 173c and third drain electrode 175c.

First passivation layer 180a, which may be made of an inorganic insulating material such as silicon nitride and silicon oxide, is formed on data conductors 171, 173a, 173b, 173c, 175a, 175b, and 175c and exposed portions of semiconductors 154a, 154b, and 154c.

A plurality of color filters 230 are formed on first passivation layer 180a. The color filters are arranged spaced apart from each other in a horizontal direction. The plurality of color filters 230 include a red color filter, a green color filter, and a blue color filter. Further, the plurality of color filters may be each formed in a stripe form along a vertical direction.

Second passivation layer 180b is formed on the plurality of color filter 230. Second passivation layer 180b is formed as an organic layer. Second passivation layer 180b includes a portion only on color filter 230 and a portion only on first passivation layer 180a.

Pixel electrode 191, which includes first subpixel electrode 191a and second subpixel electrode 191b, is formed on second passivation layer 180b. First subpixel electrode 191a and second subpixel electrode 191b are each disposed up and down, being spaced apart from each other and having first gate line 121a and second gate line 121b disposed therebetween. Thus, first subpixel electrode 191a and second subpixel electrode 191b are adjacent to each other in a column direction. A height of second subpixel electrode 191b may be approximately one to three times as high as that of first subpixel electrode 191a.

The whole shape of first subpixel electrode 191a and second subpixel electrode 192b, respectively, is a quadrangle, and each of first subpixel electrode 191a and second subpixel electrode 191b includes a cruciform stem part that is configured of horizontal stem parts 193a and 193b and vertical stem parts 192a and 192b intersecting horizontal stem parts 193a and 193b. Further, first subpixel electrode 191a and second subpixel electrode 191b each include a plurality of fine branch parts 194a and 194b, a lower protrusion 197a, and an upper protrusion 197b.

Pixel electrode 191 is divided into four sub-regions by horizontal stem parts 193a and 193b and vertical stem parts 192a and 192b. Fine branch parts 194a and 194b obliquely extend from horizontal stem parts 193a and 193b and vertical stem parts 192a and 192b, and an extending direction thereof may form an angle of approximately 45° or 135° with respect to gate lines 121a and 121b or horizontal stem parts 193a and 193b. Fine branch parts 194a and 194b of the two sub-regions adjacent to each other may be orthogonal to each other.

According to an exemplary embodiment, first subpixel electrode 191a further includes an outside stem part which encloses an outside region, and second subpixel electrode 191b further includes horizontal parts positioned at an upper portion and a lower portion, and left and right vertical parts 198 positioned at the left and right of first subpixel electrode 191a. Left is and right vertical parts 198 may prevent capacitive coupling between data line 171 and first subpixel electrode 191a. The left and right vertical part 198 may also be omitted.

First passivation layer 180a is provided with a plurality of first contact holes 185a and a plurality of second contact holes 185b through which a wide tip portion of first drain electrode 175a and a wide tip portion of second drain electrode 175b are each exposed. First contact hole 185a may connect between second subpixel electrode 191b and third drain electrode 175c and second contact hole 185b may connect between first subpixel electrode 191a and second drain electrode 175b.

The light blocking member is positioned on second passivation layer 180b. Light blocking member 220 includes first light blocking member 220a and second light blocking member 220b. First light blocking member 220a is parallel with data line 171 and extends in a vertical direction and second light blocking member 220b is parallel with the gate line and extends in a horizontal direction. An edge of light blocking member 220 may be formed to overlap the edge of color filter 230.

Spacer 240 is positioned on light blocking member 220b. Spacer 240 may be formed to protrude from second light blocking member 220b toward the upper substrate 210 and may be made of the same material as second light blocking member 220b. Spacer 240 includes main column spacer MCS and first and second sub-column spacers SCS1 and SCS2. Main column spacer MCS and first and second sub-column spacers SCS1 and SCS2 all may be formed in one pixel or may also be formed in different pixels.

Main column spacer MCS is positioned between first and second sub-column spacers SCS1 and SCS2.

First and second sub-column spacers SCS1 and SCS2 are formed at both sides of main column spacer MCS and are formed to be spaced apart from main column spacer MCS at a predetermined interval. That is, first and second sub-column spacers SCS1 and SCS2 are positioned at both sides of the main column spacer in a length direction of second light blocking member 220b, having main column spacer MCS disposed therebetween, and have a set length in a width direction of second light blocking member 220b. First and second sub-column spacers SC1 and SC2 may be formed in parallel with data line 171.

At least one of the first and second sub-column spacers SCS1 and SCS2 may be formed on contact hole 185. For example, first sub-column spacer SCS1 may be formed on first contact hole 185a, as illustrated in FIG. 5. First sub-column spacer SCS1 may be formed to cross first contact hole 185a, as illustrated in FIG. 4.

This exemplary embodiment describes an example in which first sub-column spacer SCS1 is positioned on the contact hole, but embodiments are not limited thereto, and therefore second sub-column spacer SCS2 may also be positioned on contact hole 185, and both of first and second sub-column spacers SCS1 and SCS2 may also be positioned on contact hole 185.

Main column spacer MCS serves to support an interval between upper panel 200 and lower panel 100, and first and second sub-column spacers SCS1 and SCS2 serve to assist the role of main column spacer MCS so as to support the interval between upper panel 200 and lower panel 100.

Next, describing upper panel 200, common electrode 270 is formed on upper substrate 210 and an upper alignment layer (not illustrated) may be formed on common electrode 270. Common electrode 270 transfers a common voltage.

Liquid crystal layer 3 has a negative dielectric anisotropy and the liquid crystal molecules of liquid crystal layer 3 are aligned so that the major axes thereof are vertical to the surfaces of display panels 100 and 200 in the state in which no electric field is present. Liquid crystal layer 3 includes alignment aids including reactive mesogen, and thus liquid crystal molecules may have a pretilt so that a major axis of the liquid crystal molecule is approximately parallel with a length direction of fine branch parts 194a and 194b of pixel electrode 191. The alignment aids are not included in the liquid crystal layer but may be included in the alignment layer.

The structure of the thin film transistor described with reference to FIGS. 4 and 5 is only one example, and therefore the film structure including the structure of the thin film transistor may be modified in various forms.

Hereinafter, a method for manufacturing a liquid crystal display according to an exemplary embodiment will be described with reference to FIG. 6.

Figure 6:
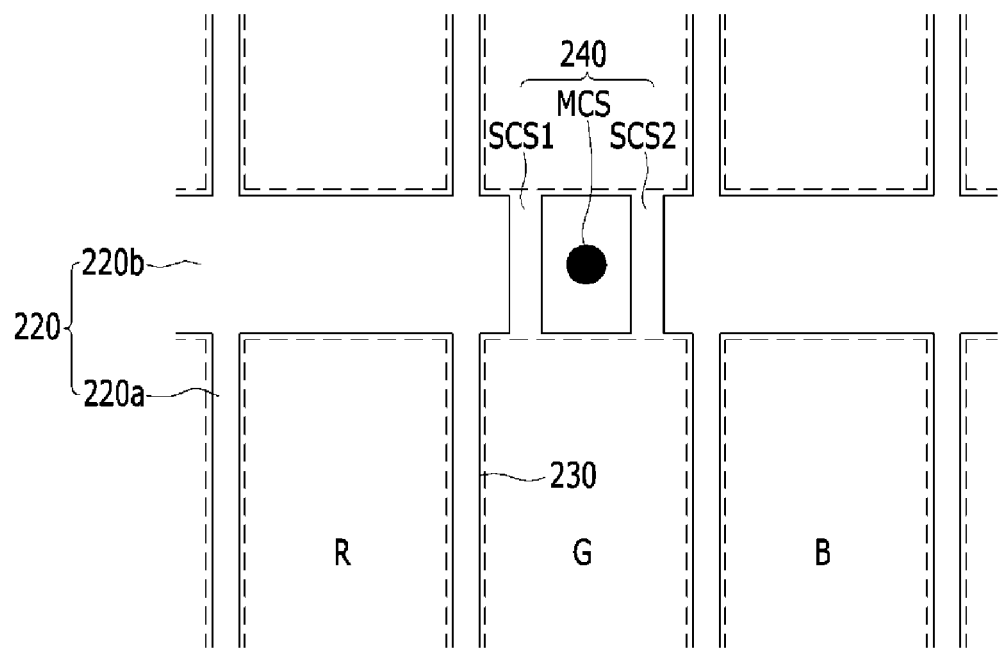
FIG. 6 is a plan view of a method for manufacturing a liquid crystal display according to an exemplary embodiment.

Referring to FIG. 6, the plurality of color filters 230 are arranged to be spaced apart from each other in a horizontal direction and are arranged to be spaced apart from each other at a predetermined interval in a vertical direction. The plurality of color filters 230 may be formed so that the red color filter, the green color filter, and the blue color filter are sequentially repeated along a horizontal direction.

Although not described, as described with reference to FIGS. 4 and 5, the film structure including the structure of the thin film transistor is formed on the lower substrate and then color filter 230 is formed on the thin film transistor.

Color filter 230 may be formed using a photolithography process and may also be formed by an inkjet method, and the like, in addition to the photolithography process. After the passivation layer having the contact hole and the pixel electrode are formed on color filter 230, light blocking member 220 is formed. Light blocking member 220 includes first light blocking member 220a and second light blocking member 220b that are formed along intervals of color filters 230 which are adjacent to each other.

First light blocking member 220a is formed between color filters 230 adjacent to each other in a horizontal direction, and second light blocking member 220b is formed between color filters 230 adjacent to each other in a vertical direction.

Second light blocking member 220b is formed to cover the thin film transistor. To simultaneously form second light blocking member 220b and spacer 240, a mask may be used. For example, to form light blocking member 220 and spacer 240, a photoresist is formed on color filter 230 and a photo process is performed using the mask. At the photo process, the height of first and second sub-column spacers SCS1 and SCS2 may be controlled and therefore a step from the main column spacer may be secured. After the photo process, light blocking member 220 and spacer 240 may be integrally formed.

Therefore, light blocking member 220, main column spacer MCS, and first and second sub-column spacers SCS1 and SCS2 may be formed to have different step heights while being simultaneously formed. The height of light blocking member 220, among light blocking member 220, main column spacer MCS, and first and second sub-column spacers SCS1 and SCS2, may be formed to be lowest. The height of main column spacer MCS may be formed to be highest.

First and second sub-column spacers SCS1 and SCS2 may be horizontally formed to first light blocking member 220a and may be formed at both sides of main column spacer MCS in a length direction of second light blocking member 220b, having main column spacer MCS disposed therebetween. First and second sub-column spacers SCS1 and SCS2 may be formed to have the same length as the width of second light blocking member 220b. That is, first and second sub-column spacers SCS1 and SCS2 may be formed in a linear form. First and second sub-column spacers SCS1 and SCS2 are formed in the linear form and therefore the height of first and second sub-column spacers SCS1 and SCS2 may be easily managed. Thus, pattern stability of first and second sub-column spacers SCS1 and SCS2 may be secured.

Next, when the upper panel including the common electrode is formed on the upper substrate and is bonded to the already formed lower panel, the liquid crystal layer is formed. The liquid crystal display including light blocking member 220 and spacer 240 having a multi step according to the exemplary embodiment may be formed.

Hereinafter, a method for manufacturing a liquid crystal display according to another exemplary embodiment of the present invention will be described with reference to FIG. 7.

Figure 7:
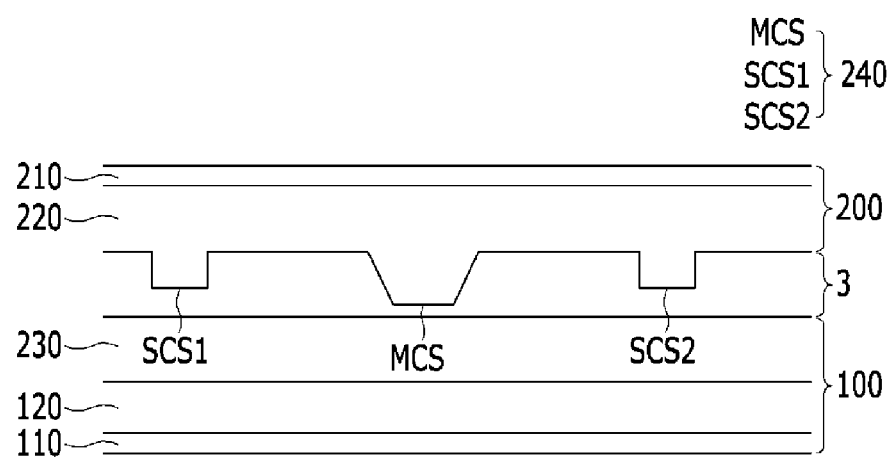
FIG. 7 is a cross-sectional view illustrating a liquid crystal display according to another exemplary embodiment.

FIG. 7 is a plan view illustrating a liquid crystal display according to another exemplary embodiment, in which the liquid crystal display is the same as the liquid crystal display illustrated in FIGS. 1 and 2 as described above, except that the position where the light blocking member and the spacer are formed is changed. Therefore, the same components other than the changed components are denoted by the same reference numeral, and therefore, the same components will be briefly described.

Referring to FIG. 7, the liquid crystal display includes lower panel 100 and upper panel 200 which face each other and the liquid crystal layer 3.

Film structure 120 including the thin film transistor is positioned on lower substrate 110.

A plurality of color filters 230 are positioned on film structure 120. In this case, the plurality of color filters 230 may be positioned to be spaced apart from each other at a predetermined interval.

In FIG. 7, an example in which color filter 230 is positioned on film structure 120 is described but exemplary embodiment are not limited thereto, and therefore color filter 230 may also be positioned on upper substrate 210.

Light blocking member 220 is formed on upper substrate 210. As illustrated in FIG. 1, light blocking member 220 includes the first light blocking member which extends in a vertical direction of color filter 230 and the second light blocking member which extends in a horizontal direction. The first light blocking member may be positioned in the interval of color filter 230 in a horizontal direction and may be connected to the second light blocking member.

Spacer 240 is positioned on light blocking member 220. That is, spacer 240 is positioned on second light blocking member 220. Light blocking member 220 and spacer 240 are integrally formed and are made of the same material.

Spacer 240 is formed in a form protruding from light blocking member 220 toward lower panel 100 and supports the interval between lower panel 100 and upper panel 200. Spacer 240 includes main column spacer MCS and first and second sub-column spacers SCS1 and SCS2. First and second sub-column spacers SCS1 and SCS2 are positioned at both sides of main column spacer MCS.

The cross section of main column spacer MCS may be formed in a circle or an oval and the cross section of first and second sub-column spacers SCS1 and SCS2 may be formed in a polygon, including a rectangle and a square.

The liquid crystal layer 3 is interposed between lower panel 100 and upper panel 200.

Therefore, in the liquid crystal display according to an exemplary embodiment, the spacer and the light blocking member may also be formed on the upper substrate as described with reference to FIG. 7 and may be formed on the lower substrate as described with reference to FIGS. 1 to 6.

According to exemplary embodiments, it is possible to prevent the smear phenomenon and the AUA by simultaneously forming the light blocking member and the spacer and implementing the multi step.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display, comprising:
   a first insulating substrate;
   a color filter disposed on the first insulating substrate;
   a light blocking member disposed on the color filter;
   a second insulating substrate facing the first insulating substrate;

a thin film transistor positioned on the first insulating substrate or the second insulating substrate and comprising a source electrode and a drain electrode;

a pixel electrode connected to the drain electrode through a contact hole; and a spacer positioned between the first insulating substrate and the second insulating substrate, wherein the spacer comprises a main column spacer and first and second sub-column spacers, and the first and second sub-column spacers are spaced apart from and disposed at both sides of the main column spacer, and at least one of the first and second sub-column spacers overlaps with the contact hole.

2. The liquid crystal display of claim 1, further comprising:

a data line and a gate line disposed on the first insulating substrate and connected to the thin film transistor.

3. The liquid crystal display of claim 2, wherein:

the light blocking member includes a first light blocking member which extends along the data line and a second light blocking member which extends along the gate line.

4. The liquid crystal display of claim 3, wherein:

the spacer is positioned on the second light blocking member.

5. The liquid crystal display of claim 3, wherein:

the first and second sub-column spacers are disposed at both sides of the main column spacer and aligned in a length direction of the second light blocking member, having the main column spacer disposed therebetween, and having a set length in a width direction of the second light blocking member.

6. The liquid crystal display of claim 2, wherein:

the first and second sub-column spacers are formed in a direction parallel to the data line.

7. The liquid crystal display of claim 2, wherein:

the first and second sub-column spacers are formed in a direction perpendicular to the data line or the first and second sub-column spacers are, in plan view, inclined relative to the data line.

8. The liquid crystal display of claim 1, wherein:

both ends of the first and second sub-column spacers are, in plan view, inclined toward the main column spacer or inclined away from the main column spacer.

9. The liquid crystal display of claim 1, wherein:

the first and second sub-column spacers comprise a ring part positioned on the light blocking member and a connection part which has one end connected to the ring part and another end positioned in the width direction of the light blocking member.

10. The liquid crystal display of claim 1, wherein:

the first and second sub-column spacers include more than one sub-column spacer each spaced apart from each other.

11. The liquid crystal display of claim 1, wherein:

a cross section of the main column spacer is formed in a circle or an oval; and a cross section of the first and second sub-column spacers comprises a polygon selected from the group consisting of a square and a rectangle.

12. The liquid crystal display of claim 1, wherein:

the first and second sub-column spacers have a height higher than that of the light blocking member and lower than that of the main column spacer.

13. The liquid crystal display of claim 1, wherein:

the light blocking member and the spacer are made of the same material.

14. A method for manufacturing a liquid crystal display, comprising:

forming a thin film transistor comprising a source electrode and a drain electrode on a first insulating substrate;

forming at least one color filter on the first insulating substrate;

forming a pixel electrode connected to the drain electrode through a contact hole;

forming a light blocking member and a spacer on the color filter; and forming a second insulating substrate facing the first insulating substrate, wherein the spacer comprises a main column spacer and first and second sub-column spacers, and the first and second sub-column spacers are spaced apart from and disposed at both sides of the main column spacer, and at least one of the first and second sub-column spacers overlaps with the contact hole.

15. The method of claim 14, further comprising:

forming a data line and a gate line disposed on the first insulating substrate and connected to the thin film transistor.

16. The method of claim 15, wherein forming of the light blocking member and a spacer on the at least one color filter comprises:

forming a first light blocking member that extends along the data line and a second light blocking member that extends along the gate line; and forming the spacer on the second light blocking member.

17. The method of claim 16, wherein:

the first and second sub-column spacers are positioned at both sides of the main column spacer in a length direction of the second light blocking member, having the main column spacer disposed therebetween and have a set length in a width direction of the second light blocking member.

18. The method of claim 15, wherein:

the first and second sub-column spacers are formed in a direction parallel or perpendicular to the data line.

19. The method of claim 14, wherein:

the first and second sub-column spacers comprise more than one sub-column spacer each spaced apart from each other.

* * * * *